United States Patent
Cheng et al.

(10) Patent No.: US 11,822,964 B2
(45) Date of Patent: Nov. 21, 2023

(54) DATA PROTECTION WITH STATIC RESOURCE PARTITION FOR DATA PROCESSING ACCELERATORS

(71) Applicants: KUNLUNXIN TECHNOLOGY (BEIJING) COMPANY LIMITED, Beijing (CN); Baidu USA LLC, Sunnyvale, CA (US)

(72) Inventors: Yueqiang Cheng, Sunnyvale, CA (US); Zhibiao Zhao, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 167 days.

(21) Appl. No.: 16/891,458

(22) Filed: Jun. 3, 2020

(65) Prior Publication Data

US 2021/0382756 A1    Dec. 9, 2021

(51) Int. Cl.
*G06F 9/50* (2006.01)
*G06F 9/455* (2018.01)
(Continued)

(52) U.S. Cl.
CPC ........ *G06F 9/5027* (2013.01); *G06F 9/45558* (2013.01); *G06F 9/5061* (2013.01); *G06N 20/00* (2019.01); *H04L 63/10* (2013.01); *G06F 2009/4557* (2013.01); *G06F 2009/45579* (2013.01); *G06F 2009/45583* (2013.01);
(Continued)

(58) Field of Classification Search
None
See application file for complete search history.

(56) References Cited

U.S. PATENT DOCUMENTS 7,634,650 B1 * 12/2009 Shah ..................... G06F 3/0662
                                                                  713/168
8,156,253 B2    4/2012 Watanabe
(Continued)

FOREIGN PATENT DOCUMENTS

CN    103049331 A  *  4/2013
EP    3306870 A1  *  4/2018   ......... G06F 13/4022
(Continued)

OTHER PUBLICATIONS

'Configure SR-IOV Network Virtual Functions in Linux KVM' by Clayne B Robison, Jun. 19, 2017. (Year: 2017).*
(Continued)

*Primary Examiner* — Steven G Snyder
(74) *Attorney, Agent, or Firm* — WOMBLE BOND DICKINSON (US) LLP

(57) ABSTRACT

Embodiments of the disclosure discloses a method and system for a virtualization environment for a data processing (DP) accelerator. In one embodiment, a data processing (DP) accelerator includes one or more statically partitioned resources and one or more virtual functions (VFs) each associated with one of the one or more statically partitioned resources. A virtual machine (VM) of a host is assigned one of the one or more VFs to access the statically partitioned resources associated with the assigned VF. The VM has no access to the rest of the one or more statically partitioned resources of the DP accelerator.

16 Claims, 6 Drawing Sheets

(51) Int. Cl.
*G06N 20/00* (2019.01)
*H04L 9/40* (2022.01)
(52) U.S. Cl.
CPC .............. *G06F 2009/45587* (2013.01); *G06F 2009/45595* (2013.01)

(56) References Cited

U.S. PATENT DOCUMENTS

| | | | |
|---|---|---|---|
| 8,761,187 B2 | 6/2014 | Barde | |
| 9,197,566 B2* | 11/2015 | Mitsunobu | H04L 47/22 |
| 9,218,303 B2 | 12/2015 | Chandrasekhar et al. | |
| 9,294,567 B2 | 3/2016 | Hussain et al. | |
| 9,298,484 B2 | 3/2016 | Cadigan, Jr. et al. | |
| 9,378,032 B2* | 6/2016 | Kurita | H04L 49/70 |
| 9,501,245 B2 | 11/2016 | Hussain et al. | |
| 9,542,350 B1* | 1/2017 | Kissell | G06F 13/14 |
| 9,569,237 B2* | 2/2017 | Ylitalo | H04W 4/70 |
| 9,569,242 B2* | 2/2017 | Challa | G06F 13/3625 |
| 9,569,244 B2* | 2/2017 | Challa | G06F 13/3625 |
| 9,813,283 B2* | 11/2017 | Cohen | H04L 29/08549 |
| 10,223,159 B2* | 3/2019 | Kaplan | G06F 9/45533 |
| 10,353,727 B2 | 7/2019 | Alvarez et al. | |
| 10,423,437 B2 | 9/2019 | Kaplan et al. | |
| 10,740,456 B1* | 8/2020 | Ismael | G06F 21/552 |
| 10,972,449 B1 | 4/2021 | Levin et al. | |
| 11,544,096 B2* | 1/2023 | Elliott | G06F 9/30101 |
| 2007/0217409 A1* | 9/2007 | Mann | H04L 63/029 370/389 |
| 2011/0321042 A1* | 12/2011 | Yang | G06F 13/387 718/1 |
| 2013/0042240 A1 | 2/2013 | Cardona et al. | |
| 2013/0055254 A1* | 2/2013 | Avasthi | G06F 9/5077 718/1 |
| 2014/0082616 A1* | 3/2014 | Kurita | H04L 49/70 718/1 |
| 2014/0115183 A1* | 4/2014 | Mitsunobu | H04L 47/621 709/232 |
| 2014/0373012 A1* | 12/2014 | Ylitalo | G06F 9/45533 718/1 |
| 2015/0370595 A1 | 12/2015 | Arroyo et al. | |
| 2016/0103698 A1* | 4/2016 | Yang | G06F 11/2033 718/1 |
| 2016/0127495 A1* | 5/2016 | Tasoulas | H04L 67/2842 709/223 |
| 2016/0149877 A1 | 5/2016 | Kancharla et al. | |
| 2016/0239326 A1* | 8/2016 | Kaplan | G06F 9/5077 |
| 2017/0180325 A1* | 6/2017 | Palermo | H04L 41/0894 |
| 2017/0344391 A1 | 11/2017 | Alvarez et al. | |
| 2018/0157521 A1* | 6/2018 | Arikatla | G06F 9/45558 |
| 2018/0321985 A1 | 11/2018 | Kakaiya et al. | |
| 2019/0107965 A1 | 4/2019 | Deval et al. | |
| 2019/0121671 A1* | 4/2019 | Guim Bernat | G06F 9/5077 |
| 2020/0409735 A1* | 12/2020 | Grandhi | G06F 9/4812 |
| 2021/0109792 A1* | 4/2021 | Cheng | G06N 20/00 |
| 2021/0149733 A1* | 5/2021 | Cheng | G06N 20/00 |
| 2021/0150002 A1* | 5/2021 | Cheng | H04L 9/3073 |
| 2021/0150406 A1* | 5/2021 | Cheng | G06F 21/10 |
| 2021/0152600 A1* | 5/2021 | Cheng | G06N 20/00 |
| 2021/0271502 A1* | 9/2021 | Elliott | G06F 9/45558 |

FOREIGN PATENT DOCUMENTS

| | | | | |
|---|---|---|---|---|
| JP | 2008097173 A | * | 4/2008 | ......... G06F 9/45558 |
| WO | WO-2015010597 A1 | * | 1/2015 | ........... G06F 13/161 |
| WO | WO-2017112256 A1 | * | 6/2017 | ............. G06F 21/53 |
| WO | 2018176393 A1 | | 10/2018 | |

OTHER PUBLICATIONS

'NFV Acceleration (Part 2)' by GalSagie, Jan. 25, 2015. (Year: 2015).*
'Hardware supported efficient accelerator partitioning for workstation consolidation and virtualization' by Johannes Hiltscher, 2015. (Year: 2015).*
Patrick Kutch: "PCI—SIG SR—IOV Primer an Introduction to SR—IOV Technology Intel LAN Access Division", Jan. 1, 2011 (Jan. 1, 2011), pp. 1-28.
Wang et al. "Improving Utilization through Dynamic VM Resource Allocation in Hybrid Cloud Environment", 2014 IEEE, 8 pages.
Real et al. "Dynamic Spatially Isolated Secure Zones for Noe-based Many-core Accelerators", 2016 IEEE, 6 pages.
Xue et al. "Shaready: a Resource-Isolated Workload Co-location System", 2019 IEEE, pp. 299-304.

* cited by examiner

DATA PROTECTION WITH STATIC RESOURCE PARTITION FOR DATA PROCESSING ACCELERATORS

TECHNICAL FIELD

Embodiments of the invention relate generally to data protection. More particularly, embodiments of the invention relate to systems and methods for data protection with static resource partition for data processing (DP) accelerators.

BACKGROUND

Sensitive transactions are increasingly being performed by data processing (DP) accelerators such as artificial intelligence (AI) accelerators or co-processors. This increases a need for better partition/isolation between DP accelerators.

For example, a malicious DPA installed into an existing cluster can obtain without permission AI models/data from other DPAs when a communication channel between DPAs is possible such that AI models and data processed by the DPAs may not be protected.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
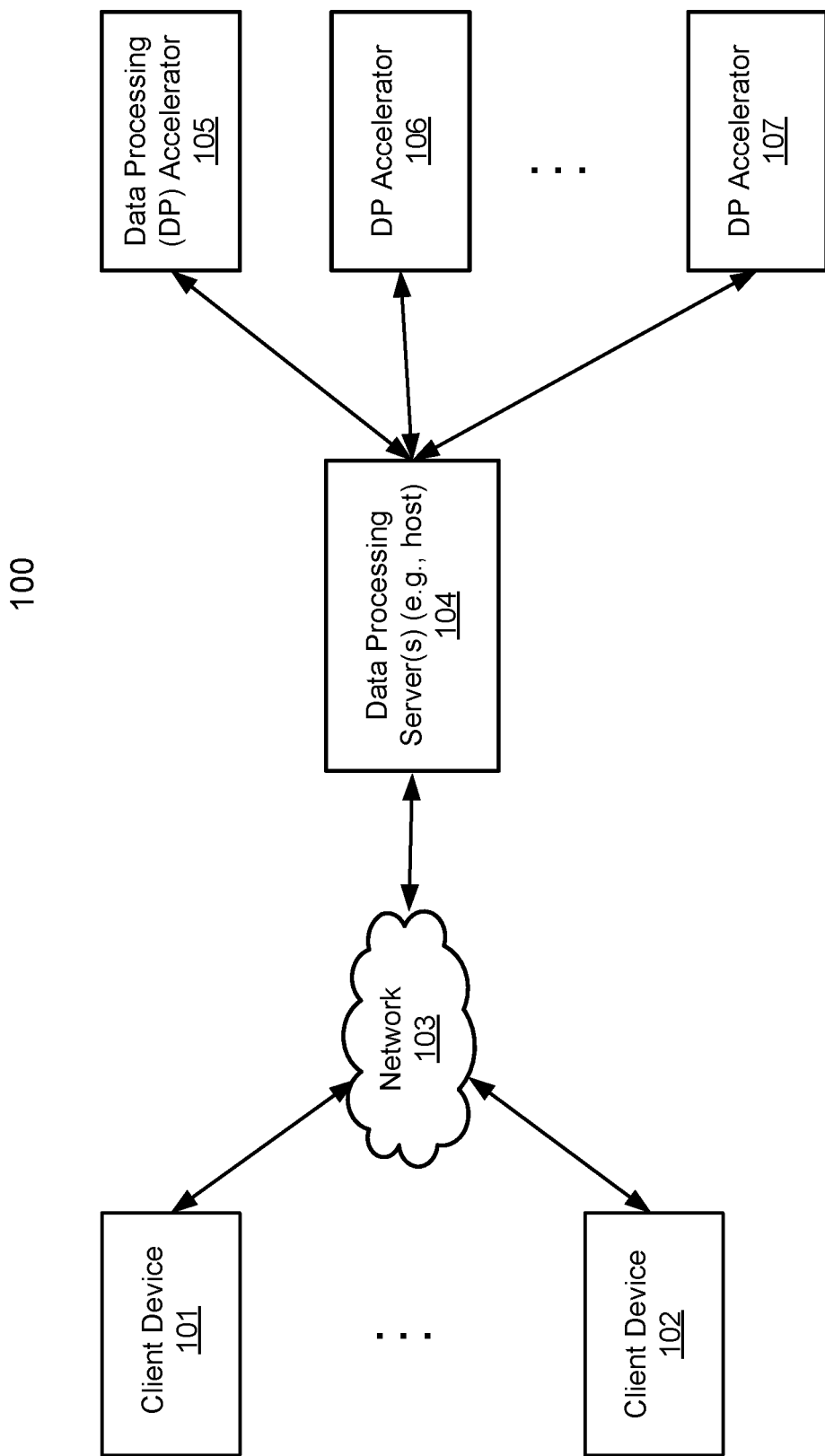
FIG. 1 is a block diagram illustrating an example of system configuration for a host and data process (DP) accelerators according to some embodiments.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to a first aspect of the disclosure, a data processing (DP) accelerator includes one or more statically partitioned resources and one or more virtual functions (VFs), each of the one or more VFs associated with one of the one or more statically partitioned resources. A virtual machine (VM) of a host is assigned one of the one or more VFs to access the statically partitioned resources associated with the assigned VF. The VM has no access to the rest of the one or more statically partitioned resources of the DP accelerator.

According to a second aspect of the disclosure, a virtual function (VF) receives a request from an application to perform an instruction by a data processing (DP) accelerator using resources of the DP accelerator from a virtual machine (VM), where the receiving is a direct pass through communication, where the VF is dedicated to the VM and the VF is one of a number of VFs of the DP accelerator. The DP accelerator performs the instruction using the DP accelerator resources based on the request and generates a result. The DP accelerator determines one or more memory addresses of the VM. The DP accelerator transmits the result to the VM using the VF based on the one or more memory addresses of the VM.

According to a third aspect of the disclosure, a data processing (DP) accelerator includes a resource management unit and one or more resources managed by the resource management unit. The DP accelerator includes one or more virtual functions (VFs) each associated with one of the one or more resources, where a virtual machine (VM) of a host is assigned one of the one or more VFs to access the resources associated with the assigned VF, and where the VM has no access to the rest of the one or more resources.

According to a fourth aspect of the disclosure, a virtual function (VF) receives a request from an application for data processing (DP) accelerator resources, where the receiving is a direct pass through communication from a virtual machine (VM) and the VF is dedicated to the VM, where the VF is one of a plurality of VFs of the DP accelerator. The DP accelerator determines a first resource isolation of the DP accelerator that is assigned to the VF. The DP accelerator determines the first resource isolation does not meet a size of the request. The DP accelerator dynamically updates, by a resource management unit of the DP accelerator, the first resource isolation to a second resource isolation to meet the request size.

FIG. 1 is a block diagram illustrating an example of system configuration for a host and data process (DP) accelerators according to some embodiments. Referring to FIG. 1, system configuration 100 includes, but is not limited to, one or more client devices 101-102 communicatively coupled to DP server(s) 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless.

Server (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, machine-learning training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., artificial intelligence (AI) training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu artificial intelligence (AI) chipset available from Baidu, Inc. or alternatively, the DP accelerator may be an AI chipset from NVIDIA, an Intel, or some other AI chipset providers.

According to one embodiment, each of the applications accessing any of DP accelerators 105-107 coupled to data processing server 104 (also referred to as a host) may verify that the application is provided by a trusted source or vendor. Each of the applications may be launched and executed within a virtual machine (VM), or an execution environment (EE) or a container, or a VM within a container, specifically configured and executed by a central processing unit (CPU) of host 104. When an application is configured to access any one of the DP accelerators 105-107, a connection can be established between host 104 and the corresponding one of the DP accelerators 105-107.

Figure 2:
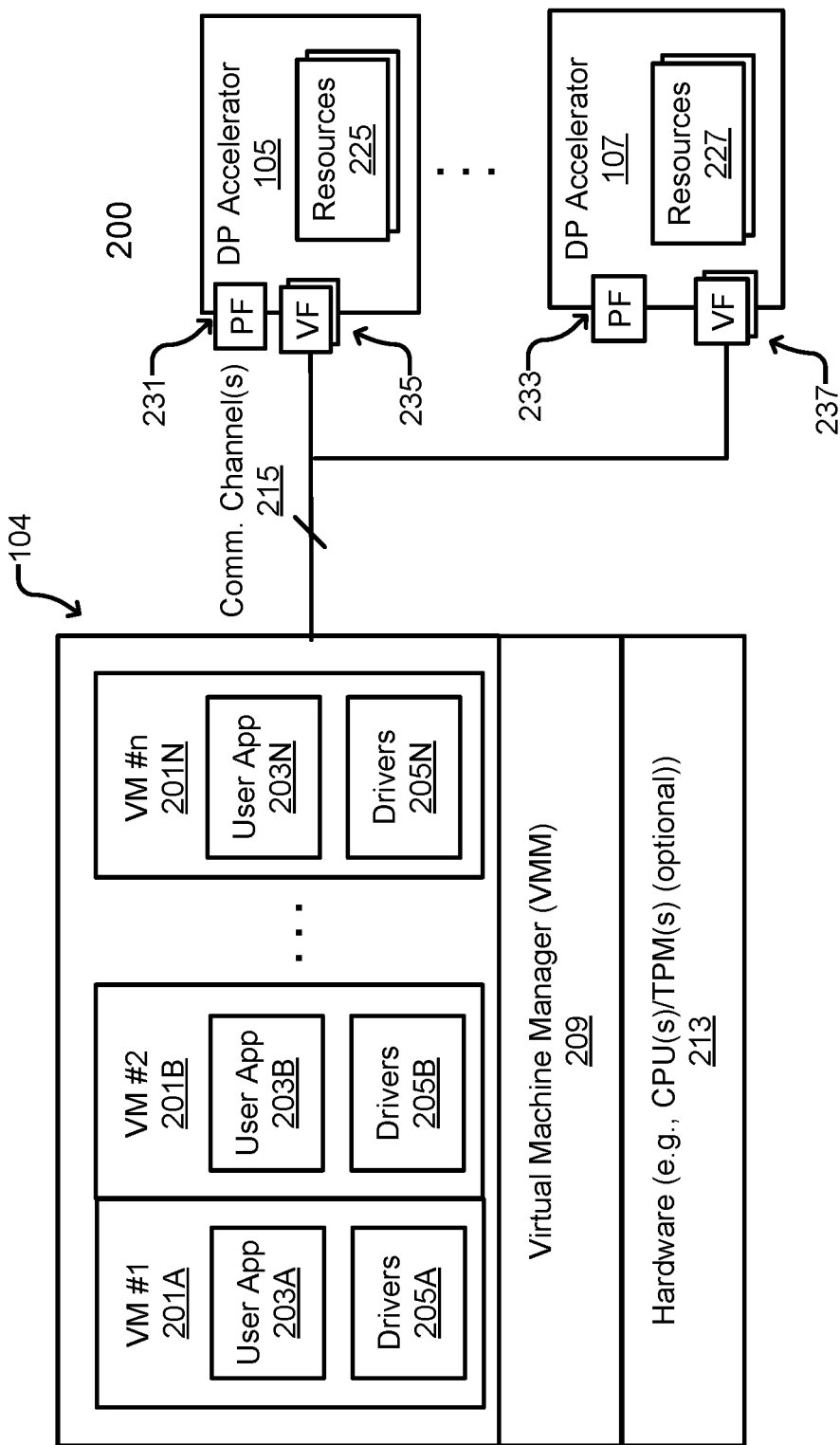
FIG. 2 is a block diagram illustrating an example of a host in communication with data process (DP) accelerators according to one embodiment.

FIG. 2 is a block diagram illustrating an example of a host in communication with data process (DP) accelerators according to one embodiment. Referring to FIG. 2, system 200 provides a virtualized environment for host/server(s) and/or DP accelerators to share common and/or dedicated resources of the DP accelerators. In one embodiment, host machine or server(s) 104 can be a system that host one or more virtual machines (VMs) 201A-201N and each VMs 201A-201N can host an operating system which can run user applications 203A-203N and drivers 205A-205N, respectively. The VMs 201A-201N may be managed by a virtual machine manager (VMM) 209. The VMM 209 (sometimes called a hypervisor) may run on hardware 213 (e.g., central processing unit (CPU), and optionally, security module(s) (e.g., trusted platform modules (TPMs)) of host machine 104. Host machine 104 is typically a CPU system which can control and manage execution jobs of user applications 203 on the host machine 104 and/or DP accelerators 105-107.

In one embodiment, host system 104 includes a hardware that has one or more CPU(s) 213 equipped with security module(s) (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot.

The TPM chip including a secure boot can secure the VMM 209 from unauthorized accesses. VMM 209 may include drivers provided by a DP accelerator vendor specifying hardware descriptors of the DP accelerators 105-107 for the host 104 to communicate with the DP accelerators 105-107. Since communication channels 215 for DP accelerators 105-107 may be exclusively occupied by VMM 209, thus, communication channels 215 can be secured through the TPM chip.

Referring to FIG. 2, system 200 can include host system 104 and DP accelerators 105-107. DP accelerators 105-107 can include Baidu AI chipsets or any other AI chipsets such as NVIDIA graphical processing units (GPUs) that can perform AI intensive computing tasks. In one embodiment, DP accelerators 105-107 are peripheral component interconnect express (PCIE) components. In one embodiment, communication channels 215 include a PCIE channel.

In one embodiment, each of VMs 201A-201N can represent a secure execution environment or a standalone container, such as a Docker container. Here, host machine 104 can instantiate one or more secure execution environments or standalone containers and each of VMs 201A-201N can be executed within the secure execution environments or standalone containers. The secure execution environments/containers may be enforced to be secure by TPM/CPU 213. Examples of a secure execution environment may be Intel software guard extensions (SGX), or AMD secure encrypted virtualization (SEV), or any non-secured execution environments. Intel SGX and/or AMD SEV can include a set of central processing unit (CPU) instruction codes that allows user-level code to allocate private regions of memory of a CPU that are protected from processes running at higher privilege levels. Here, secure execution environments can protect user applications 203 and drivers 205, where user application 203 and drivers 205 may be provided by end users and DP accelerator vendors, respectively. Here, drivers 205 can convert API calls to commands for execution, configuration, and/or control of the DP accelerators 105-107.

In one embodiment, DP accelerators 105-107 implements the single root I/O virtualization (SR-IOV) implementation standards to allow hardware-based virtualization. The SR-IOV standard enables the efficient sharing of devices among virtual machines and is implemented in the hardware to achieve I/O performance that is comparable to native performance. The SR-IOV specification defines a standard that enables a virtual machine to be directly connected to an I/O device. For example, a DP accelerator device, such as an AI accelerator that is SR-IOV-enabled with appropriate hardware and OS support can appear as multiple, separate physical DP accelerator devices, each with its own PCIE configuration space.

In one embodiment, each of DP accelerators 105-107 has at least one physical function (PF) and one or more virtual functions (VFs). SR-IOV can use PF 231-233 to manage the SR-IOV and/or VF functions for the respective DP accelerators 105-107. The VFs/PF of the DP accelerator 105-107 can be mapped to a respective VM. The resource of the DP accelerator can then be accessed directly by the VMs via PF 231-233 and VFs 235-237. In this way, each of the VMs 201 has access to unique and/or shared resources of the DP accelerator 105-107. Note that a VF is a lightweight PCIE function that shares one or more (dedicated or common) resources with a PF and/or other VFs that are associated with that PF.

A physical function (PF) is a PCI function that supports the SR-IOV capabilities as defined by the SR-IOV specification. A physical function contains the SR-IOV capability structure and manages the SR-IOV functionality. A PF is a fully featured PCIE function that can be discovered, managed, and manipulated like a PCIE device. A PF can be used to configure and control a PCIE device. The VFs can be created by a PF. After creation, VF can be assigned directly to an I/O domain. This enables the VF to share the physical device and to perform I/O without central processing unit (CPU) and hypervisor overhead.

Referring to FIG. 2, in one embodiment, drivers 205 can provide hardware input/output descriptors (not shown) of the physical functions (PFs) 231-233 and/or virtual functions (VFs) 235-237. VMs 201A-201N of host 104 can access the drivers 205 and communicate with the PFs 231-233 and/or VFs 235-237 via the hardware input/output descriptors within the drivers 205.

The host machine 104 can be set up as follows: A memory-safe Linux distribution is installed onto a system equipped with TPM secure boot. The installation can be performed offline during a manufacturing or preparation stage. The installation can also ensure that user applications 203 are programmed using memory-safe programming languages.

After installation, the system can then boot up through a TPM-based secure boot. The TPM secure boot ensures only signed/certified hardware and VMM are launched in a kernel space that provides the accelerator services. Note, a hypervisor or a virtual machine manager (VMM) is a computer software, firmware, or hardware that creates and runs virtual machines. Note, a kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, VMM 209 may launch instances of VMs 201. Next, user applications 203 and drivers 205 can be launched within an operating system of VMs 201. In one embodiment, user application 203 and drivers 205 are statically linked and launched together. In another embodiment, drivers 205 is launched in VMs 201 first and then user application 203 is dynamically loaded in VMs 201. In another embodiment, user application 203 is launched in VMs 201 first, and then driver 205 is dynamically loaded in VMs 201.

In summary, system 200 provides a hardware-based virtualization environment using one or more VMs situated at the host 104 and SR-IOV enabled DP accelerators having statically partitioned and/or resources. System 200 can include a TPM-based secure boot protection layer and a secure execution environment layer. Furthermore, system 200 can provide a memory safe user space by ensuring other applications on the host machine are implemented with memory-safe programming languages, which can further ensure a security within the applications by eliminating potential memory corruptions/vulnerabilities. In one embodiment, system 200 can include applications that use side-channel free algorithms so to defend against side channel attacks, such as cache based side channel attacks.

Figure 3:
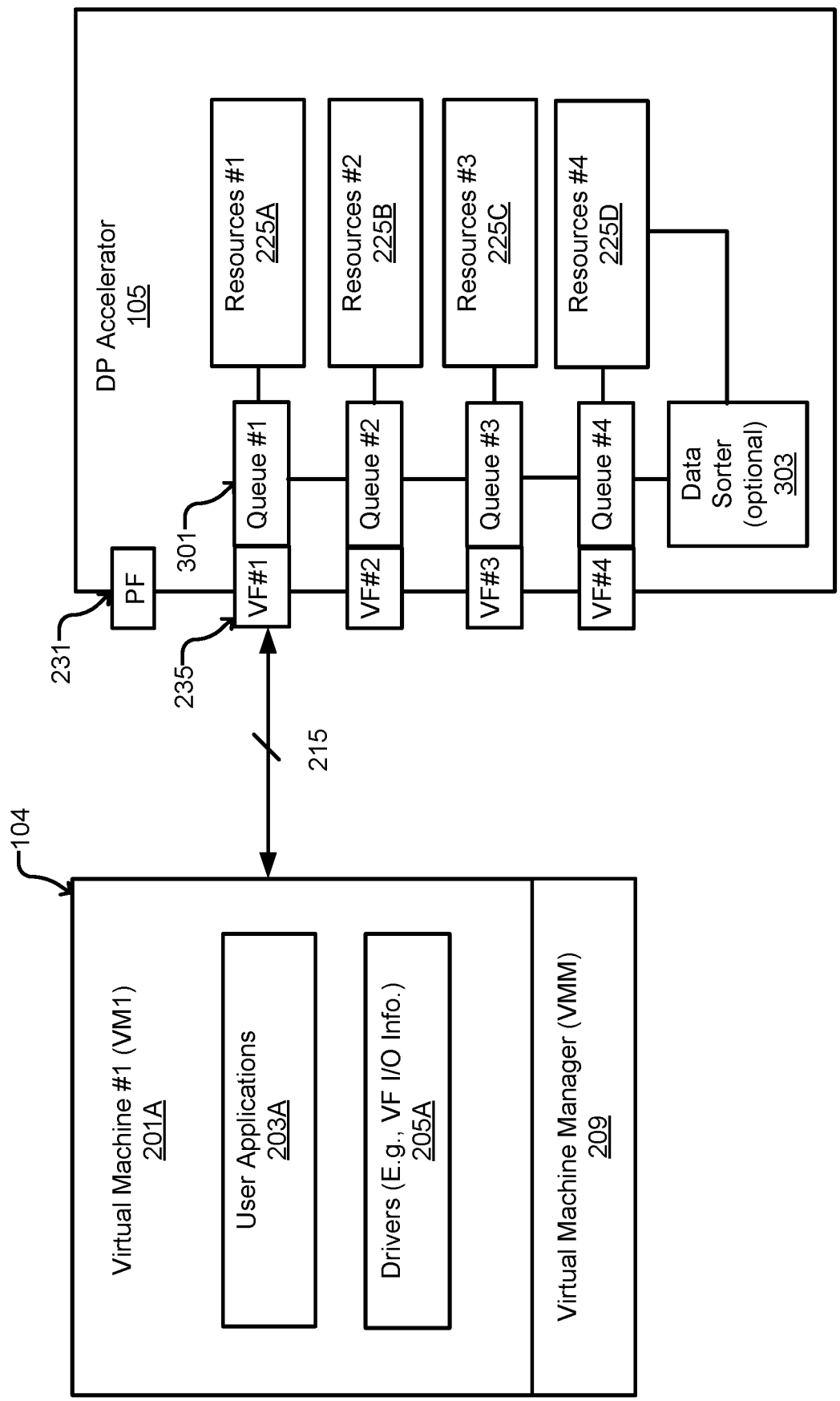
FIG. 3 is a block diagram illustrating an example of static resource partitioning for a DP accelerator according to one embodiment.

FIG. 3 is a block diagram illustrating an example of a host in communication with a DP accelerator according to one embodiment. Referring to FIG. 3, DP accelerator 105 may be statically partitioned into one or more partitions of resources and each of VFs (#1-4) 235 can be associated with a particular static partition of resources. Here, in this example, resources 225 of DP accelerator 105 can be statically partitioned into four resource partitions 225A-225D by a manufacturer/vendor of the DP accelerator. Each static partition of resources may include a number of I/O resources, data computation processing units, graphics processing units, AI processing units, memory/cache, hard drive space, registers, etc.

In one embodiment, each static partition of resources is unique from other partitions of resources (or dedicated to a particular VF). In one embodiment, one static partition of resources cannot access another static partition of resources and VM assigned to one VF that corresponds to a static partition of resources cannot access another static partition of resources. In one embodiment, the static partitions are not amenable except for deleting and repartitioning of the static partitions.

In one embodiment, drivers 205A-205N provide a hardware input output descriptors for VM 201A-201N respectively to access the VFs 235/PF 231. In one embodiment, each of VFs 235 may or may not share one or more resources of the DP accelerator 105 with the PF 231 and/or other VFs 235. This way, only a VM assigned to a particular VF can access resources associated with the VF. In other words, other VM cannot access the already assigned VF.

In one embodiment, the number of VFs is equal to the number of statically partitioned resources. In one embodiment, when a VM is instantiated, a VMM (or hypervisor) can automatically assign a VF to the VM. In another embodiment, the hypervisor assigns a VF to a container containing the VM. In one embodiment, when the number of VMs connected to the resources is greater than the number of VFs, hypervisor can no longer assign a VF to the VM. In this case, the hypervisor can queue the VM for a next available VF, or drop the assignment, or migrate the VM to another host server system (which may incur additional latency/processing cost for the user application) to use an available VF of the another host server system.

In one embodiment, DP accelerator 105 includes queues 301 and (optionally) data sorter 303. VF 235 (e.g., VF #1) can receive a request from a VM 201A (e.g., VM #1) that is assigned to VF 235 (e.g., VF #1). The request can be an I/O type, machine learning, data processing, AI training, AI inference type of requests, etc. When the DP accelerator 105 completes the request, DP accelerator 105 can determine an identifier, such as a media access control (MAC) address, of the VM 201A based on the request. Data sorter 303 can then sort the result based on the identifier and send the result to a queue 301 (e.g., queue #1) that is associated with the MAC address. Queue 301 then queues the result to be transmitted from VF 235 (e.g., VF #1) to VM 201A (e.g., VM #1) using direct memory access.

In another embodiment, when the DP accelerator 105 completes the request, the DP accelerator 105 can determine one or more memory addresses at the VM to store a result of the request. Data sorter 303 can then sort the result based on the memory addresses and send the result to a queue 301 (e.g., queue #1) that is associated with the memory addresses of the VM. Queue 301 then queues the result to be transmitted from VF 235 (e.g., VF #1) to VM 201A (e.g., VM #1)

using direct memory access. Here, direct memory access (DMA) is a method that allows an input/output (I/O) device to send or receive data directly to or from a main memory of host 104, bypassing a CPU of host 104.

Figure 4:
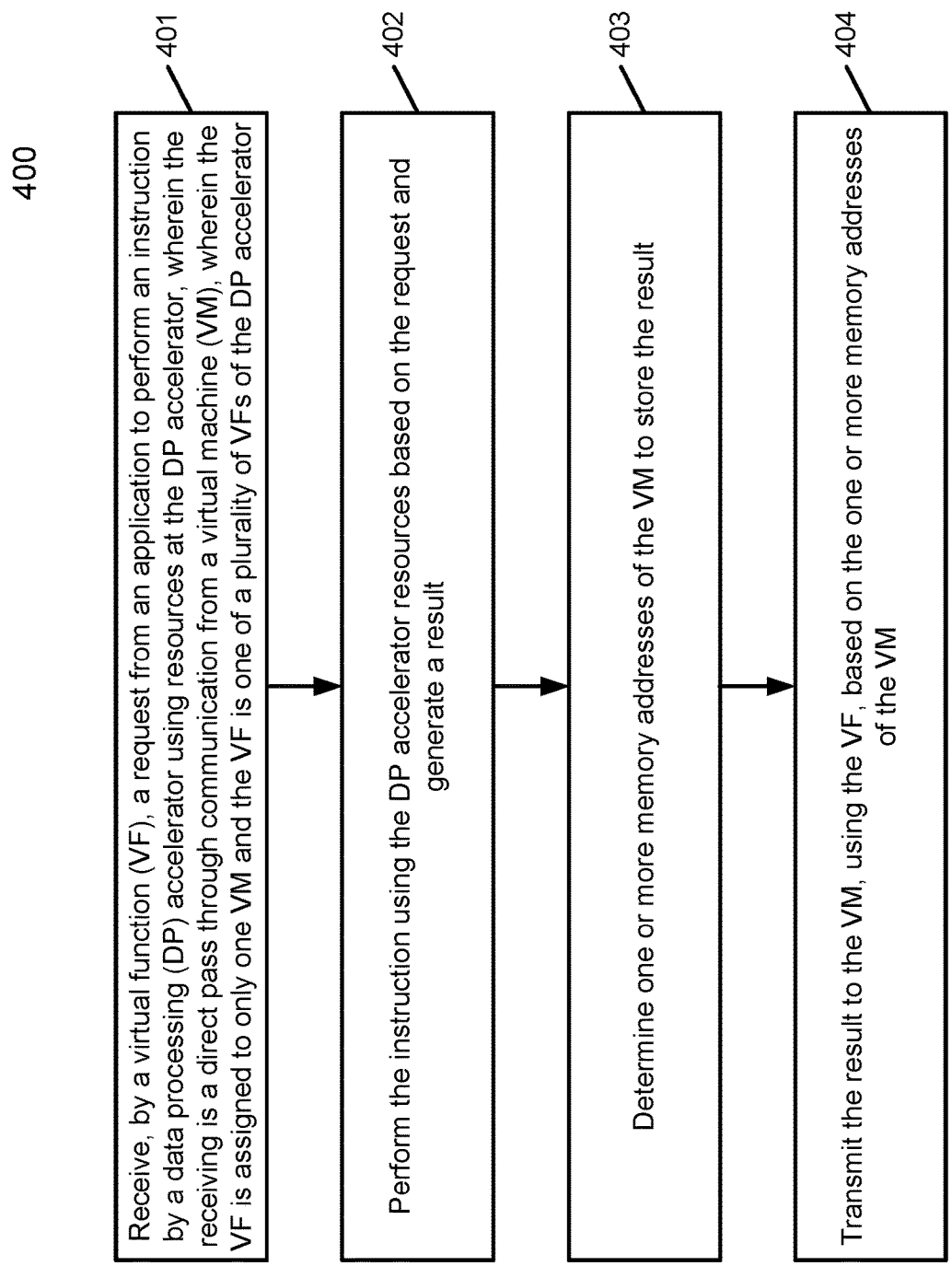
FIG. 4 is a flow chart illustrating an example method for a DP accelerator according to one embodiment.

FIG. 4 is a flow chart illustrating an example method for a DP accelerator according to one embodiment. Process 400 may be performed by processing logic which may include software, hardware, or a combination thereof. For example, process 400 may be performed by host system, such as DP accelerator 105 of FIG. 3. Referring to FIG. 4, at block 401, processing logic (e.g., VF) receives a request from an application to perform an instruction by a data processing (DP) accelerator using resources at the DP accelerator, where the receiving is a direct pass through communication from a virtual machine (VM), where the VF is dedicated to the VM (e.g., the VF is assigned to only one VM) and the VF is one of a number of VFs of the DP accelerator. At block 402, processing logic performs the instruction using the DP accelerator resources based on the request and generates a result. At block 403, processing logic determines one or more memory addresses of the VM to store the result. At block 404, processing logic transmits the result to the VM, using the VF, based on the one or more memory addresses of the VM.

In one embodiment, the instruction is an instruction to train an AI model or to perform an inference based on an AI model. In one embodiment, the hardware I/O information of the VF is located at a driver of the VM at a host hosting the application running on the VM.

In one embodiment, the DP accelerator includes a SR-IOV pass through device. in one embodiment, the VM of the host is initially assigned the VF by a virtual machine manager (VMM) of the host.

In one embodiment, data packets are transmitted between the VM and the VF corresponding to the VM without passing through the VMM. In one embodiment, data packets are transmitted between the VM and the VF corresponding to the VM via direct memory access (DMA) independent of a processing unit of the host.

Figure 5:
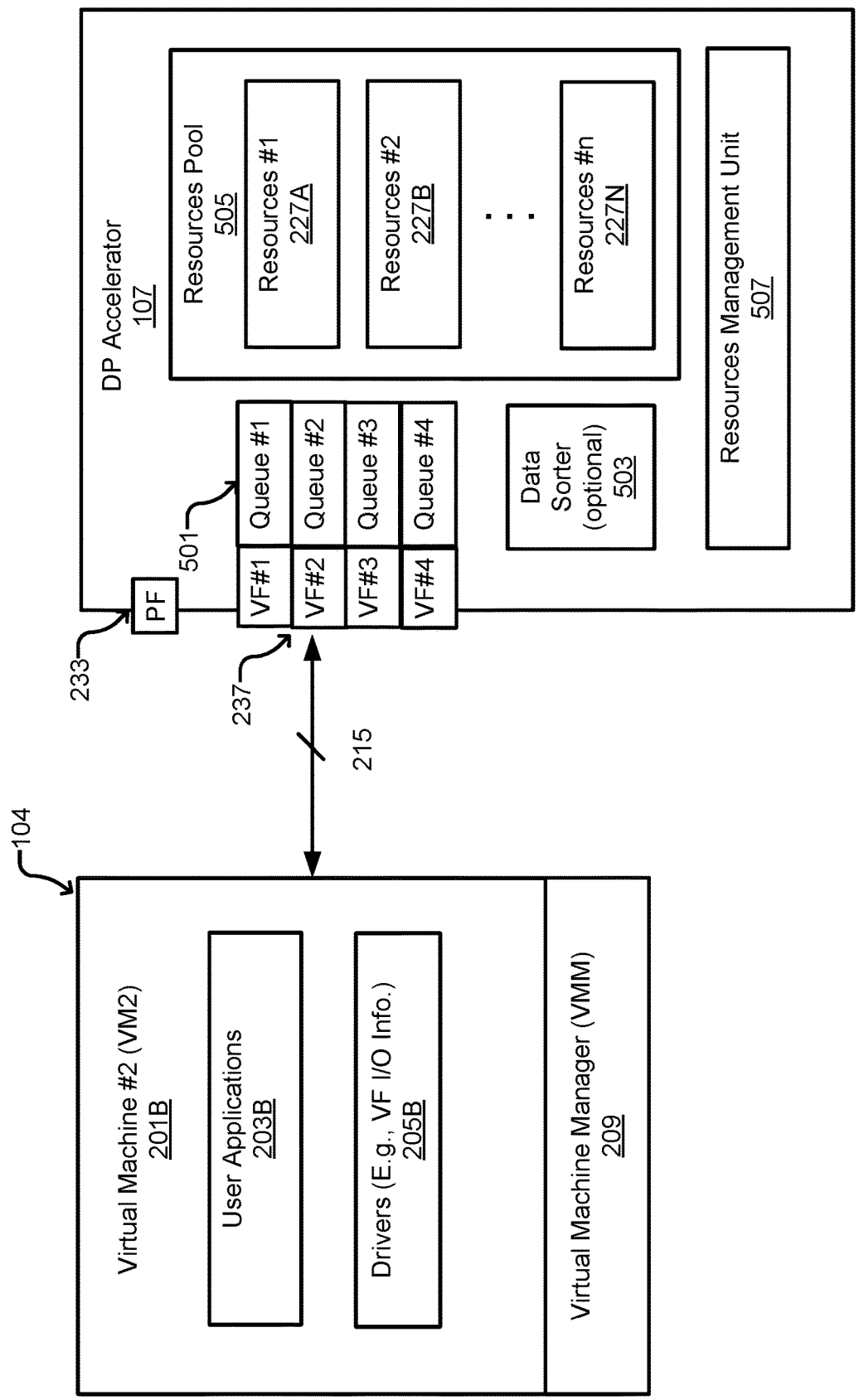
FIG. 5 is a block diagram illustrating an example of dynamically resource isolation for a DP accelerator according to one embodiment.

FIG. 5 is a block diagram illustrating an example of dynamically resource isolation for a DP accelerator according to one embodiment. Referring to FIG. 5, for one example, DP accelerator 107 includes resources pool 505 and resource management unit 507. The resource management unit 507 can manage and enforce resources isolation for resources 227 of resources pool 505. In one embodiment, resources pool 505 can dynamically instantiate a number of resource isolations 227A-227N in real-time. For example, VFs 237 #1-4 may be associated with PF 233. In this case, resources pool 505 can instantiate n resource isolations 227A-227N for the VFs 237 #1-4, respectively. VM 201B can be assigned to any one of the four VFs 237 #1-4 (here, VF #2). VFs #1-4 can access any resource isolations 227A-227N according to a request from a VM at a VF assigned to the VM. Each resource isolation may include a number of I/O resources, data computation processing units, graphics processing units, AI processing units, memory/cache, hard drive space, registers, etc.

In one embodiment, DP accelerator 107 includes queues 501 and (optionally) data sorter 503. VF 237 (e.g., VF #2) can receive a request from a VM 201B (e.g., VM #2) that is assigned to VF 237 (e.g., VF #2) (assigned by VMM 209 of host 104). The request can be an I/O type, machine learning, data processing, AI training, AI inference type of requests, etc. Next, a resource isolation from resource pool 505, such as resource 227B #2 may be dynamically instantiated for the request based on a size of the request.

In one embodiment, in response to determining a larger number of resources is required for the request (or for subsequent requests), VM #2 transmits a control command to resource management unit 507 (via VMM 209 of FIG. 2) to control the resource management unit 507 to dynamically update resource 227B #2. Here, resource 227B #2 may be updated to have a larger number of resources based on the request size. The update may use resources available to or maintained by resource pool 505 (e.g., common resources (not shown) available to resource pool 505).

When the DP accelerator 107 completes the request, DP accelerator 107 can determine an identifier, such as media access control (MAC) address, for the VM #2 based on the request. Data sorter 503 can then sort the result based on the identifier and send the result to a queue 501 (e.g., queue #2) associated with the identifier. Queue 501 then queues the result to be transmitted from VF 237 (e.g., VF #2) to VM 201B (e.g., VM #2) using direct memory access. In another embodiment, when the DP accelerator 107 completes the request, DP accelerator 107 can determine one or more memory addresses at the VM to store a result of the request. Data sorter 503 can then sort the result based on the memory addresses and send the result to a queue 501 (e.g., queue #2) that is associated with the memory addresses of the VM. Queue 501 then queues the result to be transmitted from VF 237 (e.g., VF #2) to VM 201B (e.g., VM #2) using direct memory access.

Figure 6:
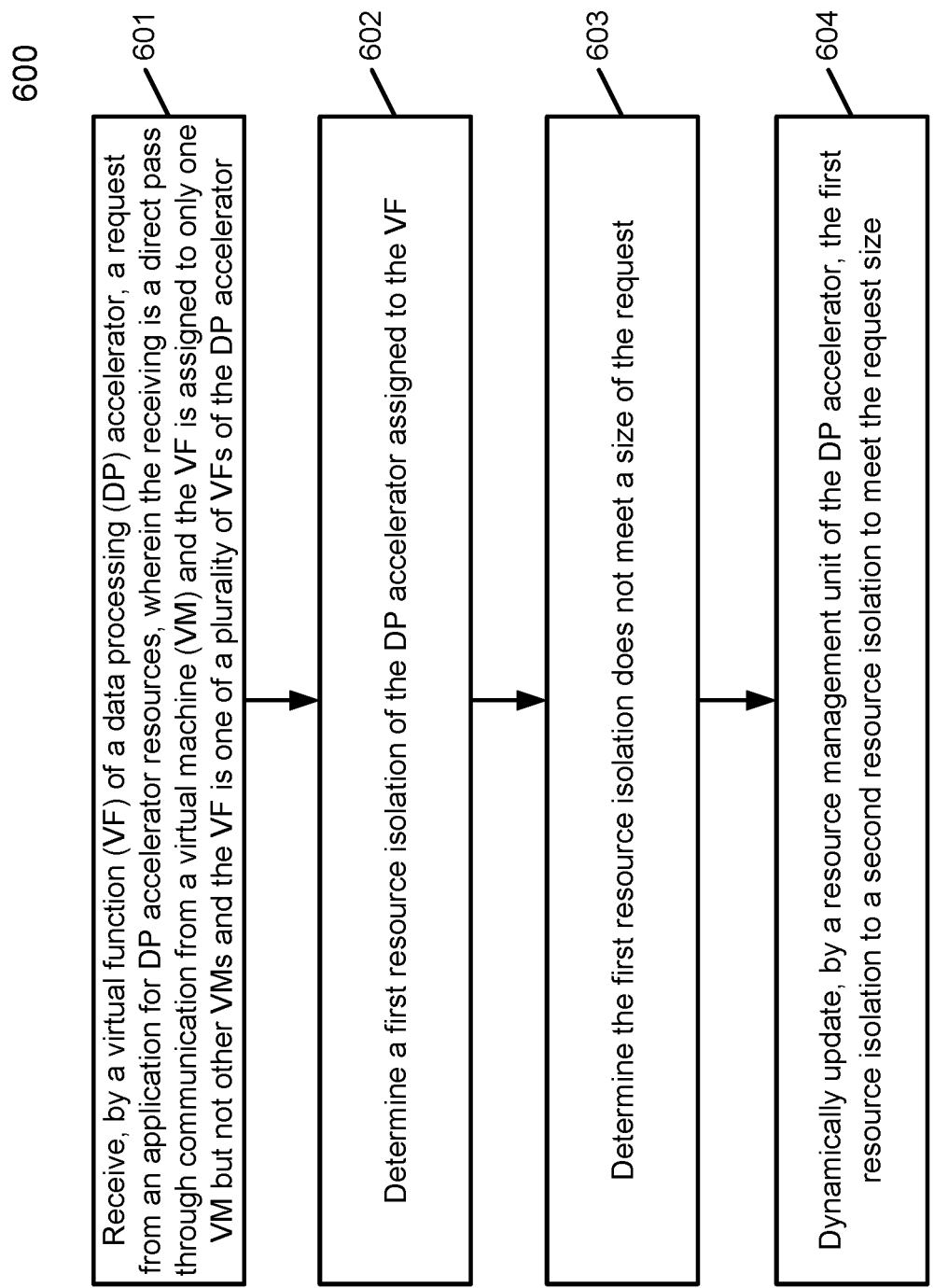
FIG. 6 is a flow chart illustrating an example method for a DP accelerator according to one embodiment.

FIG. 6 is a flow chart illustrating an example method for a DP accelerator according to one embodiment. Process 600 may be performed by processing logic which may include software, hardware, or a combination thereof. For example, process 600 may be performed by host system, such as DP accelerator 107 of FIG. 5. Referring to FIG. 6, at block 601, processing logic (e.g., VF) receives a request from an application for DP accelerator resources, wherein the receiving is a direct pass through communication from a virtual machine (VM), wherein the VF is assigned to only one VM but not other VMs, and the VF is one of a plurality of VFs of the DP accelerator. At block 602, processing logic determines a first isolation of the DP accelerator resources are assigned to the VF. At block 603, processing logic determines the first isolation of resources does not meet a size of the request. At block 604, processing logic dynamically updates, by a resource management unit of the DP accelerator, the first resource isolation to a second resource isolation to meet the request size.

In one embodiment, the request includes a request to train an AI model. In one embodiment, the hardware I/O information of the VF is located at a driver of the VM at a host hosting the application.

In one embodiment, the DP accelerator includes a single root input output virtualization (SR-IOV) pass through device. In one embodiment, the VM of the host is initially assigned the VF by a virtual machine manager (VMM) of the host In one embodiment, data packets are transmitted directly between the VM and the VF assigned to the VM without passing through the VMM. In one embodiment, data packets are transmitted between the VM and the VF corresponding to the VM via direct memory access (DMA) independent of a processing unit of the host.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A data processing (DP) accelerator, comprising:
    one or more statically partitioned resources;
    one or more virtual functions (VFs) each associated with one of the one or more statically partitioned resources, wherein a virtual machine (VM) of a host is assigned with one of the one or more VFs to access the statically partitioned resources associated with the assigned VF, and wherein the VM has no access to rest of the one or more statically partitioned resources of the DP accelerator, wherein the VM is instantiated within a secure execution environment and the secure execution environment is enforced by a hardware trusted platform module (TPM) of the host;
    one or more input/output (I/O) queues, wherein each of the VFs transmits data packets to the VM via one of the one or more I/O queues over a peripheral component interconnect express (PCIE) bus, wherein data packets are transmitted directly between the VM and the VF assigned to the VM without passing through a virtual machine manager (VMM); and
    a data sorter communicatively coupled to the one or more I/O queues, wherein the data sorter is configured to:
        identify an identifier of the VM;
        determine one or more memory addresses at the VM;
        sort data packets from the one or more statically partitioned resources according to the one or more memory addresses and/or the identifier of the VM; and
        send the sorted data packets to an I/O queue corresponding to the identifier of the VM,
        wherein the I/O queue is further configured to transmit the sorted data packets to the one or more memory addresses at the VM over the PCIE bus.

2. The DP accelerator of claim 1, further comprising a single root input output virtualization (SR-IOV) pass through device.

3. The DP accelerator of claim 1, wherein the VM transmits data packets directly to the VF via hardware access to the VF using a VF driver running on the VM.

4. The DP accelerator of claim 1, wherein a virtual machine manager (VMM) of the host assigns the VM of the host to communicate with the VF.

5. The DP accelerator of claim 4, wherein the VMM of the host assigns at most one VF to the VM, and wherein if none of the one or more VFs are available for assignment, the VMM waits for a next of the one or more VFs to become available for assignment, or the VMM denies the assignment, or the VMM migrates the VM to another host to be assigned to a VF of the another host.

6. A data processing (DP) system, comprising:
    a host; and
    a DP accelerator coupled to the host, the DP accelerator comprising:
        one or more statically partitioned resources;
        one or more virtual functions (VFs) each associated with one of the one or more statically partitioned resources, wherein a virtual machine (VM) of a host is assigned with one of the one or more VFs to access the statically partitioned resources associated with the assigned VF, and wherein the VM has no access to rest of the one or more statically partitioned resources of the DP accelerator, wherein the VM is instantiated within a secure execution environment and the secure execution environment is enforced by a hardware trusted platform module (TPM) of the host;
one or more input/output (I/O) queues, wherein each of the VFs transmits data packets to the VM via one of the one or more I/O queues over a peripheral component interconnect express (PCIE) bus, wherein data packets are transmitted directly between the VM and the VF assigned to the VM without passing through a virtual machine manager (VMM); and
a data sorter communicatively coupled to the one or more I/O queues, wherein
the data sorter is configured to:
identify an identifier of the VM;
determine one or more memory addresses at the VM;
sort data packets from the one or more statically partitioned resources according to the one or more memory addresses and/or the identifier of the VM; and
send the sorted data packets to an I/O queue corresponding to the identifier of the VM,
wherein the I/O queue is further configured to transmit the sorted data packets to the one or more memory addresses at the VM over the PCIE bus.

7. The DP system of claim 6, wherein the DP accelerator includes a single root input output virtualization (SR-IOV) pass through device.

8. The DP system of claim 6, wherein the VM transmits data packets directly to the VF via hardware access to the VF using a VF driver running on the VM.

9. The DP system of claim 6, wherein a virtual machine manager (VMM) of the host assigns the VM of the host to communicate with the VF.

10. The DP system of claim 9, wherein the VMM of the host assigns at most one VF to the VM, and wherein if none of the one or more VFs are available for assignment, the VMM waits for a next of the one or more VFs to become available for assignment, or the VMM denies the assignment, or the VMM migrates the VM to another host to be assigned to a VF of the another host.

11. A computer-implemented method, comprising:
receiving, by a virtual function (VF), a request from an application to perform an instruction by a data processing (DP) accelerator using resources of the DP accelerator, wherein the receiving is a direct pass through communication from a virtual machine (VM) over a peripheral component interconnect express (PCIE) bus, wherein the VF is assigned to only one VM and the VF is one of a plurality of VFs of the DP accelerator, wherein the VM is instantiated within a secure execution environment and the secure execution environment is enforced by a hardware trusted platform module (TPM) of a host;
performing the instruction using the DP accelerator resources based on the request and generating a result;
determining one or more memory addresses of the VM;
identifying an identifier for the VM;
sorting data packets corresponding to the result based on the one or more memory addresses and/or the identifier of the VM; and
transmitting, by an input/output (I/O) queue of the DP accelerator, the sorted data packets to the VM based on the one or more memory addresses and/or the identifier of the VM over the PCIE bus, wherein the instruction is an instruction to train an artificial intelligence (AI) model or to perform an inference based on an AI model.

12. The computer-implemented method of claim 11, wherein hardware input/output (I/O) information of the VF is located at a driver of the VM at a host hosting the application running on the VM.

13. The computer-implemented method of claim 11, wherein the DP accelerator includes a SR-IOV pass through device.

14. The computer-implemented method of claim 11, wherein the VM of a host is initially assigned the VF by a virtual machine manager (VMM) of the host.

15. The computer-implemented method of claim 14, wherein data packets are transmitted between the VM and the virtual function corresponding to the VM without passing through the VMM.

16. The computer-implemented method of claim 11, wherein data packets are transmitted between the VM and the VF corresponding to the VM via direct memory access (DMA) independent of a processing unit of a host.

* * * * *